United States Patent
Flanagan (10) Patent No.: US 7,809,726 B2
(45) Date of Patent: Oct. 5, 2010

(54) MECHANISM FOR UNSUPERVISED CLUSTERING

(75) Inventor: Adrian Flanagan, Vantaa (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 10/506,634

(22) PCT Filed: Mar. 3, 2003

(86) PCT No.: PCT/FI03/00152

§ 371 (c)(1),
(2), (4) Date: Sep. 3, 2004

(87) PCT Pub. No.: WO03/075221

PCT Pub. Date: Sep. 12, 2003

(65) Prior Publication Data

US 2005/0102301 A1    May 12, 2005

(30) Foreign Application Priority Data

Mar. 4, 2002    (FI) .................................. 20020414

(51) Int. Cl.
  G06F 7/00    (2006.01)
  G06F 17/30    (2006.01)
  G06N 3/02    (2006.01)
(52) U.S. Cl. ......................................... 707/737; 706/15
(58) Field of Classification Search ............... 707/1–10, 707/100 S, 737; 706/10–20, 29
See application file for complete search history.

(56) References Cited

U.S. PATENT DOCUMENTS

| | | | |
|---|---|---|---|
| 5,809,490 A * | 9/1998 | Guiver et al. ................. 706/16 |
| 6,012,058 A * | 1/2000 | Fayyad et al. .................. 707/6 |
| 6,226,408 B1 * | 5/2001 | Sirosh ......................... 382/224 |
| 6,260,036 B1 * | 7/2001 | Almasi et al. .................. 707/2 |
| 6,260,336 B1 | 7/2001 | Motomura .................... 53/551 |
| 6,278,799 B1 * | 8/2001 | Hoffman ..................... 382/159 |
| 6,581,058 B1 * | 6/2003 | Fayyad et al. .................. 707/6 |
| 2001/0032198 A1 * | 10/2001 | Pao et al. ....................... 706/2 |

OTHER PUBLICATIONS

Patent Abstracts of Japan, vol. 200, No. 025, Apr. 12, 2001 & JP 2001 229362.

Bezdek et al, "Fuzzy Kohonen Clustering Networks", IEEE International Conference on fuzzy systems (Cat. No. 92CH3073-4), Mar. 8-12, 1992, pp. 1035-1043.

Lee et al, "An Investigation Into Unsupervised Clustering Techniques", Proceedings of the IEEE SoutheastCon 2000, Preparing fo the New Millennium, (cat. No. 00CH37105), Apr. 7-9, 2000, pp. 124-130.

Vesanto et al, "Clustering of the Self-Organizing Map", IEEE Trans. Neural Netw. (USA), May 2000, vol. 11, No. 3, pp. 586-600.

* cited by examiner

*Primary Examiner*—John R. Cottingham
*Assistant Examiner*—Kimberly Lovel
(74) *Attorney, Agent, or Firm*—Ditthavong Mori & Steiner, P.C.

(57) ABSTRACT

A computer-implemented method for determining cluster centers in a first data structure, wherein the first data structure comprises a lattice structure of weight vectors that create an approximate representation of a plurality of input data points. The method can include performing a first iterative process for iteratively updating the weight vectors such that they move toward cluster centers; performing a second iterative process for iteratively updating a second data structure utilizing results of the iterative updating of the first data structure; and determining the weight vectors that correspond to cluster centers of the input data points on the basis of the second data structure.

24 Claims, 7 Drawing Sheets

```
x=linspace(0,10,100);

figure for i=1:1.5:10
    p=0.3+(0.4*(1-(i/10)));
    y=exp(-0.03*x.*x*i).*(p-(0.01*i*x.*x))/p;
    plot(x,y)
    hold on
end
```
~60

| Area | Label |
|------|-------|
| 1 | 2 |
| 2 | 4 |
| 3 | 5 |
| 4 | 6 |
| 5 | 8 |

MECHANISM FOR UNSUPERVISED CLUSTERING

BACKGROUND OF THE INVENTION

The invention relates to clustering techniques that are generally used to classify input data into groups or clusters without prior knowledge of those clusters. More particularly, the invention relates to methods and apparatus for automatically determining cluster centres. An example of such clustering techniques is a Self-Organizing Map, originally invented by Teuvo Kohonen. The SOM concept is well documented, and a representative example of an SOM application is disclosed in U.S. Pat. No. 6,260,036.

The current framework under investigation for describing and analyzing a context has a critical component based on the clustering of data. This clustering is expected to appear at every stage of context computation, from the processing of raw input signals to the determination of a higher order context. Clustering has been well studied over many years and many different approaches to the problem exist. One of the main problems is knowing how many clusters exist in the data. Techniques exist to estimate the number of clusters in a data set, however the methods either require some form of a priori information or assumptions on the data, or they estimate the number of clusters on the basis of an analysis of the data, which may require storing the data, and be computationally demanding. None of these approaches seems entirely suitable for an on-line, unsupervised cluster analysis in a system with limited resources, as would be the case for a context-aware mobile terminal.

Clustering is an important part of any data analysis or information processing problem. The idea is to divide a data set into meaningful subsets so that points in any subset are closely related to each other and not to points in other subsets. The definition of 'related' may be as simple as the distance between the points. Many different approaches and techniques can be applied to achieve this goal. Each approach has its own assumptions and advantages and disadvantages. One of the best-known methods from the partition-based clustering class is the K-means algorithm, which tries to adaptively position K 'centres' that minimize the distance between the input data vectors and the centres. One of its disadvantages is that the number of the K centres must be specified before the clustering is attempted. In the case of an unknown data set this may not always be possible. The algorithm can be run several times with different values of K and the optimum K is chosen on the basis of some criteria. For an on-line system where the data is not stored, this approach is slow and impractical.

Thus a problem associated with the known clustering techniques is that while it is relatively easy for humans to determine the cluster centres, such a determination is difficult for computers.

BRIEF DESCRIPTION OF THE INVENTION

An object of the invention is to provide a method, an apparatus, and a computer-readable storage medium carrying one or more sequences of one or more computer-readable instructions. The computer-readable instructions, when executed by a processor, cause the apparatus to implement the method so as to alleviate the above disadvantages. In other words, the object of the invention is to provide a method for automatically determining cluster centres, such that the method is easily implemented in a computer system.

The object of the invention is achieved by a method and an arrangement which are characterized by what is stated in the independent claims. The preferred embodiments of the invention are disclosed in the dependent claims.

A computer-implemented method according to the invention can be implemented by the following steps:
  initializing a first data structure that comprises a lattice structure of weight vectors that create an approximate representation of a plurality of input data points;
  performing a first iterative process for iteratively updating the weight vectors such that they move toward cluster centres;
  performing a second iterative process for iteratively updating a second data structure utilizing the results of the iterative updating of the first data structure; and
  determining, on the basis of the second data structure, the weight vectors that correspond to the cluster centres of the input data points.

A preferred embodiment of the invention is based on the following idea. Self-organizing maps generally use a lattice structure of nodes, and a weight vector is associated with each node. Each data point in the input data is iteratively compared with each weight vector of the lattice, and the node whose weight vector best approximates the data point is chosen as the winner for that data point and iteration. Then the weight vectors associated with each node of the lattice are adjusted. The adjustment made to each node's weight vector is dependent on the winning node through a neighbourhood function. Following the adjustment of the weight vectors a next iteration step is taken.

As used in this context, the term 'neighbourhood function' is a function of distance on the lattice between the winning node and the node being updated such that the value of the function generally decreases as the distance increases. With normalized SOMs, the value of the function is one for a distance of zero. A common form for the neighbourhood function is Gaussian, but preferred embodiments of the invention make use of neighbourhood functions that are not strictly Gaussian.

In addition to the primary iteration process for updating the SOM, or other clustering mechanism, a second iterative process is run, and the second iterative process gives a numerical value for the lattice nodes such that the numerical value increases if the node's weight vector is positioned at a cluster centre. Then the cluster centres are determined, not on the basis of the weight vectors, but on the basis of the numerical values produced by the second iterative process.

Thus the problem of locating cluster centres reduces to a relatively straightforward problem of locating local maxima in the numerical values produced by the second iterative process.

An advantage of the invention is that it is much easier for machines to locate local maxima in the numerical values than to locate cluster centres in the clustering mechanism wherein the cluster centres are the location in which the density of the weight vectors is highest.

In a preferred embodiment of the invention, the second data structure comprises a coefficient for each of the weight vectors in the lattice structure. Each iteration in the first iterative process comprises selecting a winner weight vector for each of the data points on the basis of a distance measure between the input data point and the weight vector. Each iteration in the second iterative process comprises calculating a next value of each coefficient on the basis of the current value of the coefficient; and a combination of: 1) the current coefficient of the winner weight vector, 2) a second neighbourhood function that approaches zero as the distance on the lattice structure between the weight vector and the winner weight vector increases, and 3) an adjustment factor for adjusting convergence speed between iterations.

The combination referred to above can be a simple multiplication.

If the second neighbourhood function is selected appropriately, such that the second data structure has distinct borders, the step of determining the weight vectors can be accomplished simply by selecting local maxima in the second data structure.

A preferred version of the second neighbourhood function is not monotonous, but gives negative values at some distances. Also, the second neighbourhood function is preferably made more pronounced over time as the number of prior iterations increases.

Preferably, the first data structure is or comprises a self-organizing map and the input data points represent real-world quantities.

BRIEF DESCRIPTION OF THE DRAWINGS

In the following the invention will be described in greater detail by means of preferred embodiments with reference to the attached drawings, in which.

DETAILED DESCRIPTION OF THE INVENTION

A practical example of the invention is disclosed in the context of self-organizing maps. An SOM is a learning algorithm or mechanism from the area of Artificial Neural Networks (ANNs) that find wide application in the area of vector quantization, unsupervised clustering and supervised classification. Reasons for its widespread use include its robustness, even for data sets of very different and even unknown origin, as well as the simplicity of its implementation. The SOM uses a set of weight vectors to form a quantized, topology-preserving mapping, of the input space. The distribution of the weights reflects the probability distribution of the input. The SOM representation is used in clustering applications generally by clustering the weight vectors after training, using for example the K-means algorithm. However the problem of the original K-means algorithm still remains, that is, determining the value of K for the number of centres. In the following, a method based on the SOM algorithm is described which can be used to automatically determine cluster centres in an unsupervised manner. In other words, the number of clusters does not have to be predefined and groups of adjacent SOM weight vectors represent the cluster centres. Unlike the K-means algorithm where each cluster is represented by one centre, in the inventive algorithm the cluster is represented by a set of centres which correspond to weight vectors in the SOM. The algorithm requires few additional computational resources and makes direct use of the information generated during the learning of the SOM. It is already clear why the algorithm can be considered a hybrid of the K-means algorithm and a method based on a probabilistic mixture model. Each cluster is represented by a set of centres, which correspond to a set of weights in the SOM. The SOM weights, in turn, form an approximation of the probability distribution of the input.

From the ANN point of view this may be interesting, as the algorithm uses lateral inhibition between the weight vectors to generate the clusters and a form of Hebbian learning. It is clear that the performance of the clustering depends heavily on the topology-preserving and converging ability of the SOM.

The SOM Algorithm

Figure 1:
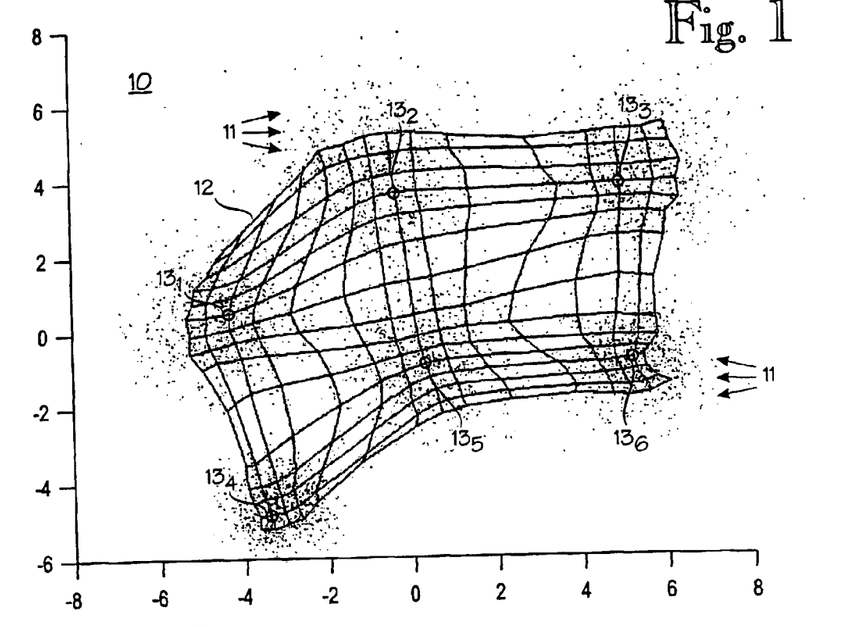
FIG. 1 illustrates a self-organizing map (SOM) with six clusters of input data points.

FIG. 1 shows a self-organizing map 10. More particularly, FIG. 1 shows an online version of SOM. There also exists a "batch SOM" but this requires storing all the input points and going through all of them several times, which is why the online-version is preferred here. Reference numerals 11 generally denote input data points that in most SOM applications represent real-world events or quantities. The SOM algorithm creates an SOM or lattice structure 12 by means of an iterative process that can be summarized as follows. Consider a time sequence of inputs $\omega(t), t=1, \ldots$, with $\omega \in R^m$ and a probability distribution $p_\omega$. The SOM itself consists of a total of N weight vectors $X \in R^m$ distributed on an n-dimensional lattice. Thus there are two associated dimensions, a dimension m of the input data and the weight vectors, and a dimension n of the lattice. The reason for having a lattice is to be able to define neighbourhood relations between adjacent weights. For example, if each weight k has an associated position vector $i_k \in I^n$ on the lattice, then a distance $d_L(i_j, i_k)$ between weights k and j on the lattice can be defined. The initial values of the weight vectors can be randomly chosen, as the convergence of the algorithm is independent of the initial conditions. At each iteration, a distance $d(\omega(t), X_k)$ between an input $\omega(t)$ at time t and each of the weight vectors $X_k$ is calculated. A winner weight $v(t)$ at time t is then defined as:

$$v(t) = \arg \min d(\omega(t), X_k) \quad [1]$$

$$1 \leq k \leq N$$

For real-valued data, a possible distance measure $d(.,.)$ could be the Euclidean distance. When the winner has been found, each weight vector is updated as:

$$X_k(t+1) = X_k(t) + \alpha(t) h(k, v(t))(\omega(t) - X_k(t)) \quad [2]$$

where $\alpha(t) \in [0,1]$ is a decreasing function of time which determines the learning rate of the SOM and h is a neighbourhood function which is a function of the distance on the lattice between the winner weight and the updated weight, that is: $h(k, v(t)) = h(d_L(i_{v(t)}, i_k))$.

Figure 2:
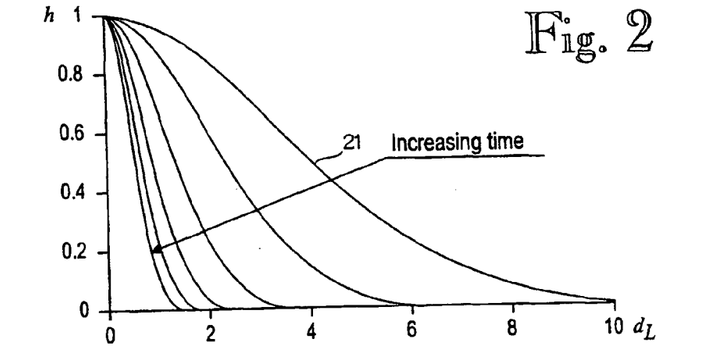
FIG. 2 shows a typical form of a neighbourhood function used in an SOM algorithm.

FIG. 2 shows a typical form 21 of a neighbourhood function h used in the SOM algorithm. The neighbourhood function h is positive, having a maximum value of 1 for $d_L = 0$ and decreasing monotonically towards 0 as $d_L$ increases. In practical situations h is often Gaussian, i.e. of the form:

$$h(d_L)=e^{-ad_L^2} \qquad [3]$$

... for some appropriately chosen scaling factor a which may be a function of time. The SOM map is built iteratively. In other words, the steps in equations [1] and [2] are repeated for each t. For uniformly distributed input data and a two-dimensional lattice with 15×15 weights, the SOM algorithm gives the result shown in FIG. 3.

Figure 3:
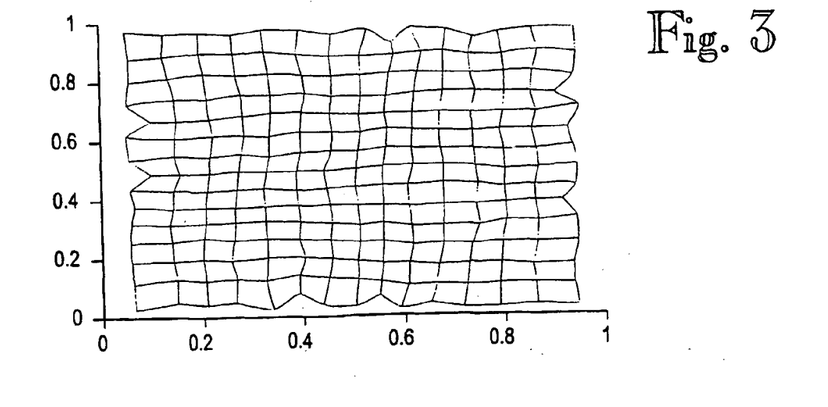
FIG. 3 shows a 15 by 15 lattice structure resulting from uniformly distributed input data.

FIG. 3 shows a plot of the weight values on a support [0,1]×[0,1] of the input, where adjacent weights on the lattice are connected by a line segment in the plot. None of the line segments intersect, which indicates that the weights are organized. The weight values are spread uniformly over the input space and approximate the uniform distribution of the input data. To arrive at such a result the learning is divided into two phases. In the first phase, there is a large α and a, and the algorithm is in the self-organizing phase where the weights become organized. The second phase is the convergence phase where the neighbourhood width is reduced to zero as a increases and α approaches zero. The weight vectors converge to the approximation of the probability distribution of the input.

Unsupervised Clustering Based on the SOM

After the description of the basic SOM algorithm, some techniques of determining cluster centres will be disclosed. Consider the SOM shown in FIG. 1. FIG. 1 shows data points generated from six different normal distributions with different means and variances, and plotted on this there are the weight vectors from the SOM when data from this distribution was used as an input. It is seen that the weight vectors are organized and are more concentrated at the centres of the clusters. Hence the approximation of the probability distribution of the input. Reference numerals $13_1$ to $13_6$ denote six circles located at the cluster centres. The circles are not normally part of the SOM. While it is easy for humans to determine where the cluster centres are, this task is surprisingly difficult for computers.

Figure 4:
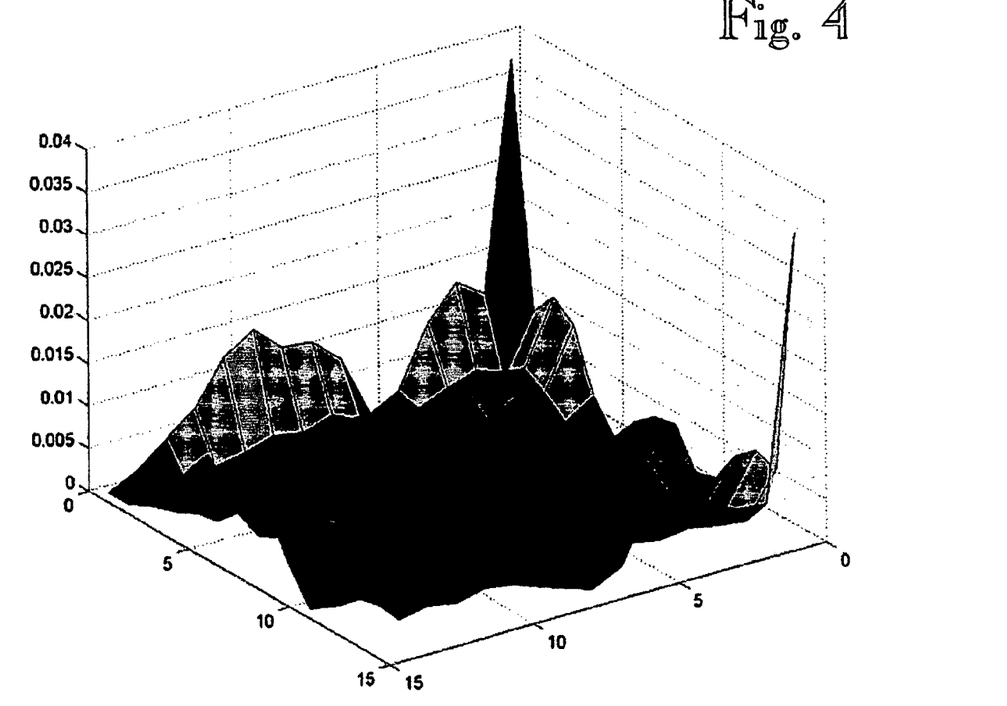
FIG. 4 shows a probabilistic map for visualizing the cluster centres in an SOM with six cluster centres.

First, a probabilistic algorithm for determining the cluster centres will be briefly disclosed. FIG. 4 shows a plot of the calculated probability of each weight vector being chosen as a winner during the simulation. The probability for each weight vector is determined by keeping a record of the number of times the weight vector was chosen as a winner and then dividing the number by the total number of iterations in the simulation. The i, j axis indicate the position of each weight on the SOM lattice and the p(i, j) axis shows the probability of each of the weights. From this probability distribution a cluster structure is visible where local maxima in the surface correspond to weight vectors positioned at input data cluster centres and local minima form a boundary between the local maximum and hence the clusters. However, the different clusters are not clearly distinct and the surface is not smooth. This roughness of the surface and variations in the peak values of the local maxima may lead to problems when trying to automatically determine the cluster centres using an algorithm which would associate a local maximum of the probability with a cluster centre. Defining a global threshold above which a weight vector would be considered a local maximum and a second global threshold below which a weight vector would be considered a local minimum leads to problems. For example, if in one part of the lattice the probability at a local maximum is below the global threshold to be considered a local maximum hence a cluster centre could lead to erroneous choice of cluster centres. In practice, as in the example shown, this is likely to occur. An alternative would be to define local thresholds for determining a local maximum and a local minimum. However this would be a complicated process requiring an involved computation with no guarantee of a correct result.

A clustering algorithm according to a preferred embodiment of the invention is based on this observation. In effect the algorithm provides a means to smooth the probability surface just described. The use of a neighbourhood function means that the smoothing operation is done locally, emphasising the local maximum as well as the local minimum. The positive elements of the neighbourhood function emphasise the local maximum and the negative components emphasise the local minimum. The result is that all the local maxima consistently reach high values and the local minima consistently reach low values. This allows for the use of a global threshold to identify the maximum and minimum and thus facilitates the use of a computer in the process. Hence instead of using directly the probability of a weight being the winner, a measure somehow related is used in the proposed algorithm which is described as follows.

For each weight i define a scalar coefficient $C_i$. This coefficient is bounded to the interval [0, 1], and its initial value before training may be quite small. The SOM algorithm is carried out as described earlier. At each iteration the winner weight v(t) is determined as in equation [1] and each SOM weight i is updated according to equation [2]. At the same time each coefficient $C_i$ is updated as:

$$C_i(t+1)=C_i(t)+C_{v(t)}(t)h_m(d_L)\delta \qquad [4]$$

where $h_m$ is the second neighbourhood function. $d_L$ and v(t) are the same terms that were used in the SOM algorithm, that is, $d_L$ is the distance on the lattice between node i and the winner node v(t). δ is a small step value for adjusting convergence speed. δ is somewhat analogous to the α in the SOM algorithm.

Following the update $C_i(t+1)$ is then forced within the interval [0, 1]. For example, if $C_i(t+1)>1$, it can be set to 1, and if $C_i(t+1)\leq 0$, it can be set to 0.01. Since the update of $C_i(t)$ depends on the value of $C_{v(t)}$, learning is clearly Hebbian.

Figure 5:
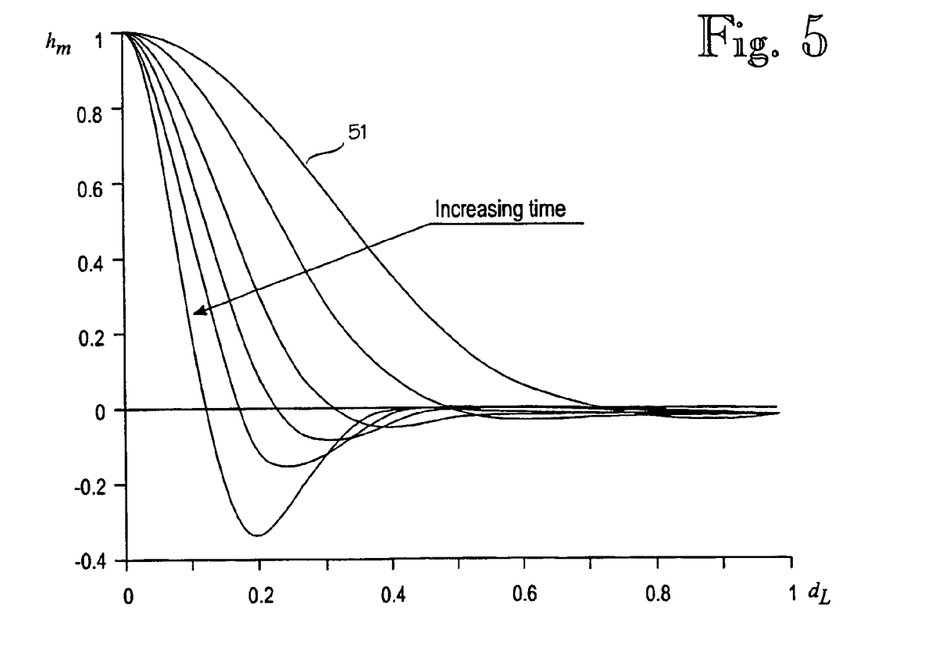
FIG. 5 shows a preferred form of the second neighbourhood function used in the second iterative process according to a preferred embodiment of the invention.

FIG. 5 shows a preferred form 51 of the second neighbourhood function $h_m$. Actually, FIG. 5 shows a time-dependent version of the second neighbourhood function $h_m$ where the function becomes more pronounced as the number of prior iterations increases. In other words, with increasing time, the function $h_m$ achieves negative values sooner (as the distance $d_L$ increases), and the negative values are much more negative than during the earlier iterations.

As can be seen, the preferred form 51 of the second neighbourhood function $h_m$ somewhat resembles the first neighbourhood function h used in the SOM algorithm. Like the first neighbourhood function h, the second neighbourhood function $h_m$ starts at 1 when the distance is zero. Also, h and $h_m$ both approach zero as the distance $d_L$ increases.

However, for some distances, the second neighbourhood function $h_m$ is preferably negative. For instance, in a 10 by 10 lattice, $h_m$ may be negative for distances over 3. The negative value of the second neighbourhood function $h_m$ can be seen as a form of lateral inhibition between the weights. Lateral inhibition is a mathematical model that tries to approximate real biological phenomena. Similar to the h function used in the SOM, weights adjacent to the centre of activity have their coefficients and hence their activity increased, while the activity of weights further away from the centre of activity are inhibited.

This lateral inhibition is rarely if ever used in practical applications, however. In the SOM, the interaction between the weight vectors is defined by the neighbourhood function h defined by equation [3], which is strictly positive. If h was allowed to be negative at any point, divergence of the weight vectors could result, instead of convergence. In the clustering method proposed here this lateral inhibition is used to determine the cluster centres.

Intuitively it can be seen that if weight i is quite often the winner then $C_i$ will increase along with its neighbours. Similarly, when the winner is i, for its closest neighbours j at a small distance from i on the lattice such that that $h_m$ is positive, the $C_j$ will also increase. At the same time, for j at a large distance from i on the lattice, where $h_m$ is negative, the $C_j$ will decrease. Similarly, if i is not often the winner, its $C_i$ will not increase very much and will be decreased by other winners located at a distance on the lattice. Given the example in FIG. 1, it is clear that weights in the inter-cluster regions will have a lower probability of being winners, whereas weights close to the cluster centres will have a higher probability of being winners. Hence it would be expected that the coefficients $C_i$ would be higher for weights positioned in or near the cluster centres and small for positions between the clusters. This would then provide boundaries between the cluster centres. Of course this depends on the fact that the weight vectors $X_i$ reach an organized configuration.

Figure 6:
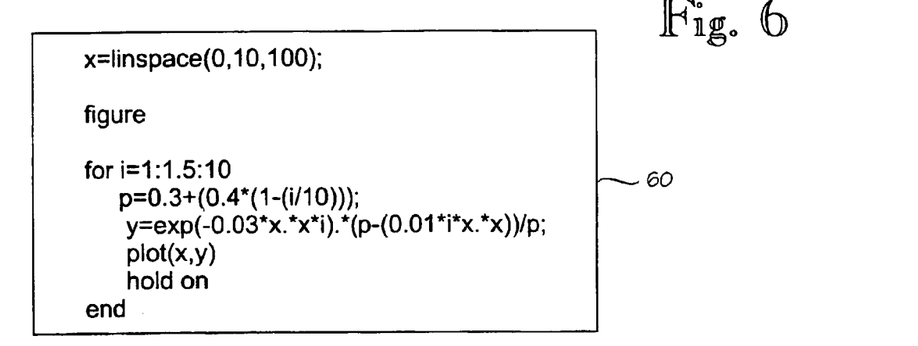
FIG. 6 shows a computer pseudocode listing for generating the function shown in FIG. 5.

FIG. 6 shows an example of a computer pseudocode listing for generating the function shown in FIG. 5.

Figure 7:
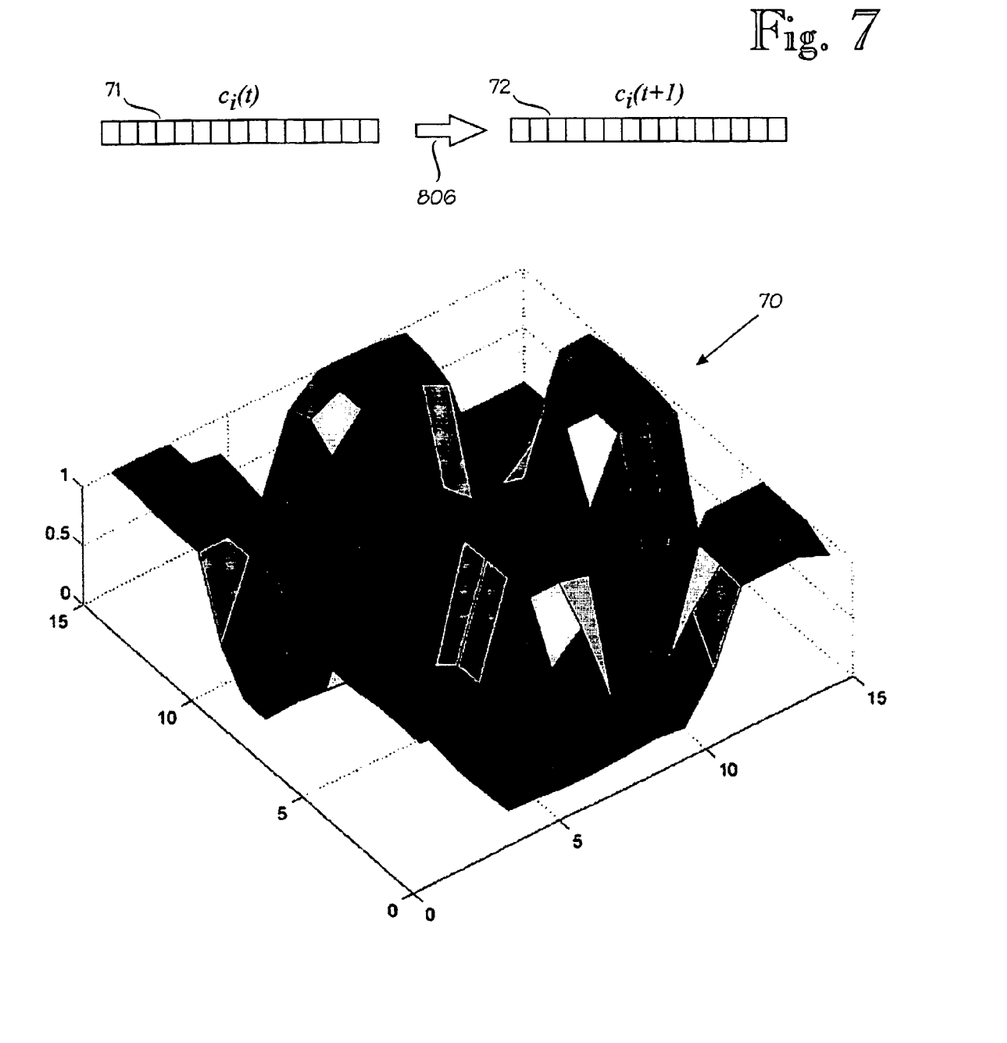
FIG. 7 shows a coefficient map that visualizes the data structure used for locating the cluster centres in the SOM.

FIG. 7 shows a plot 70 of the coefficient values C(i, j) for the weights i, j in the SOM of FIG. 1 with δ=0.01 after 20000 iterations. The second neighbourhood function $h_m$ varied with time and initially did not have a high level of lateral inhibition. Towards the end of the simulation, the level of lateral inhibition was increased. The surface shown in FIG. 7 has six distinct and separated elevated regions. As a result of forcing the $C_i$ between 0 and 1, each elevated region corresponds to a set of adjacent weights on the lattice whose coefficients $C_i$ have saturated at or near 1 and whose weights $X_i$ are found at the cluster centre. These regions are surrounded by regions where the coefficients $C_i$ have been driven to small values. Hence it is possible to determine which weights represent the same cluster. To determine which cluster an input vector belongs to, simply find the closest centre and assign the input to the cluster to which the centre belongs. Thus unlike the K-means algorithm where one weight represents the cluster, in the algorithm proposed here a group of weights represents the cluster. The means of classification is the same. Because the coefficients $C_i$ are saturated near 0 or 1, it is a simple task to determine the cluster centres using a global threshold, the value of which could be set for example at 0.5.

It should be noted that the plot 70 is for visualization purposes only and is not required by computers. Instead, reference number 71 points to an array of current coefficients $C_i(t)$ and reference number 72 to an array of next coefficients $C_i(t+1)$. It is the array 72 of updated coefficients that a computer uses to determine the cluster centres and their locations. An arrow 806 denotes updating of the coefficients that takes place in step 806 of FIG. 8 that will be described next.

Figure 8:
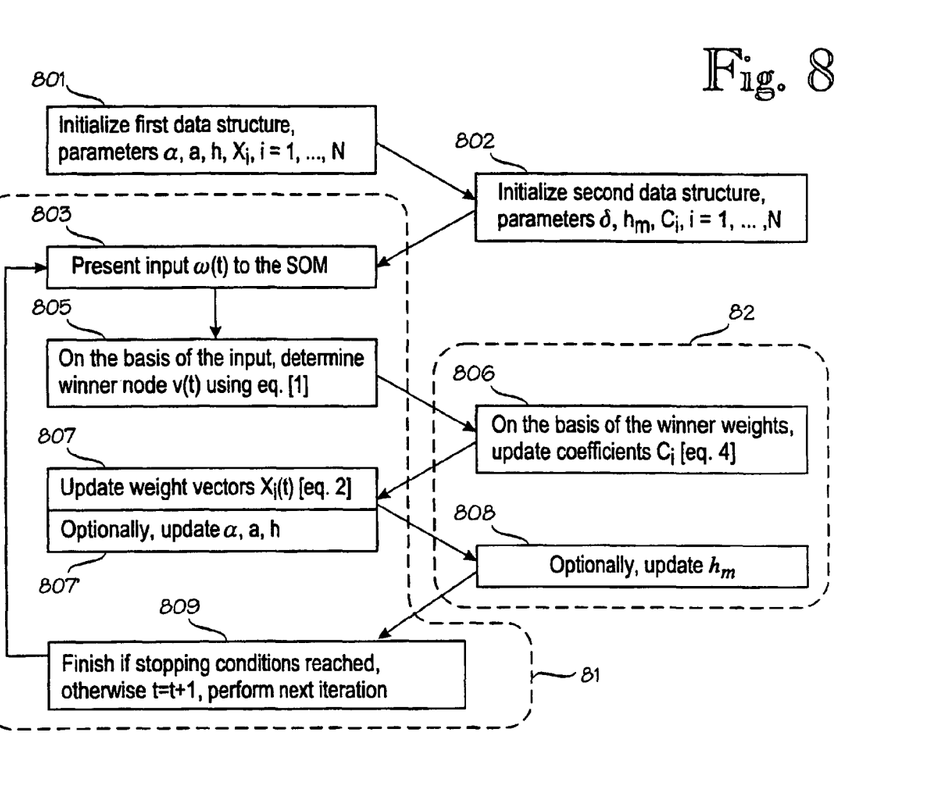
FIG. 8 is a flow chart illustrating a method according to the invention wherein the method comprises two iterative processes run in tandem.

FIG. 8 is a flow chart illustrating a method according to a preferred embodiment of the invention wherein the method comprises two iterative processes 81 and 82 run in tandem. The odd-numbered steps on the left-hand side of FIG. 8 relate to the known SOM algorithm. The even-numbered steps on the right-hand side of FIG. 8 relate to the inventive algorithm for maintaining and updating the second data structure that is used to determine the cluster centres automatically. In step 801 the SOM algorithm is initialized. The initialization comprises selecting initial values for the α, a, h and randomly initializing the weight vectors $X_i$. Since FIG. 8 shows an online algorithm, the values of the inputs ω(t) are not known at this stage. Step 802 is a corresponding initialization step for the second data structure. Steps 803, 805, 807 and 809 form the conventional SOM iteration. In step 803, input ω(t) is presented to the SOM at iteration t. In step 805, the winner weight v(t) is selected according to equation [1]. In step 807, the weight vectors are updated according to equation [2]. In an optional step 807', the variables α that determine learning speed and/or the a of the first neighbourhood function h are updated. In step 809, the iterative loop is repeated until some predetermined stopping criteria are met. For instance, the loop may be set to run a predetermined number of times, or the loop may be interrupted when each succeeding iteration fails to produce a change that exceeds a given threshold.

Steps 806 and 808 relate to the second iterative process 82 for maintaining and updating the second data structure that is used to determine the cluster centres. In step 806, the coefficients $C_i$ are updated on the basis of the winner weights v(t) according to equation [4]. In an optional step 808, parameters for the second neighbourhood function $h_m$ are updated (see FIG. 5). According to a preferred feature of the invention, steps 806 and 808 of the second iterative process 82 are interleaved with the steps of the first iterative process 81. In this way, step 806 utilizes intermediate calculation results of step 805. Similarly, step 808, in which the second neighbourhood function $h_m$ is updated, may utilize data from step 807 that updates the variable α and the first neighbourhood function.

Figure 9:
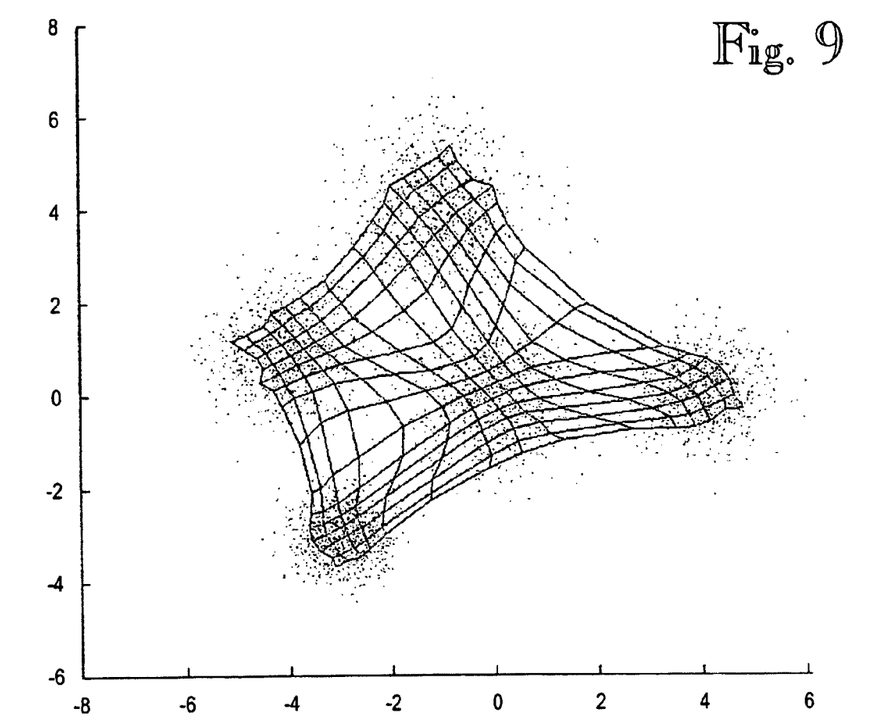
FIGS. 9 and 10 show an SOM map and a coefficient map, respectively, with five clusters.
Figure 10:
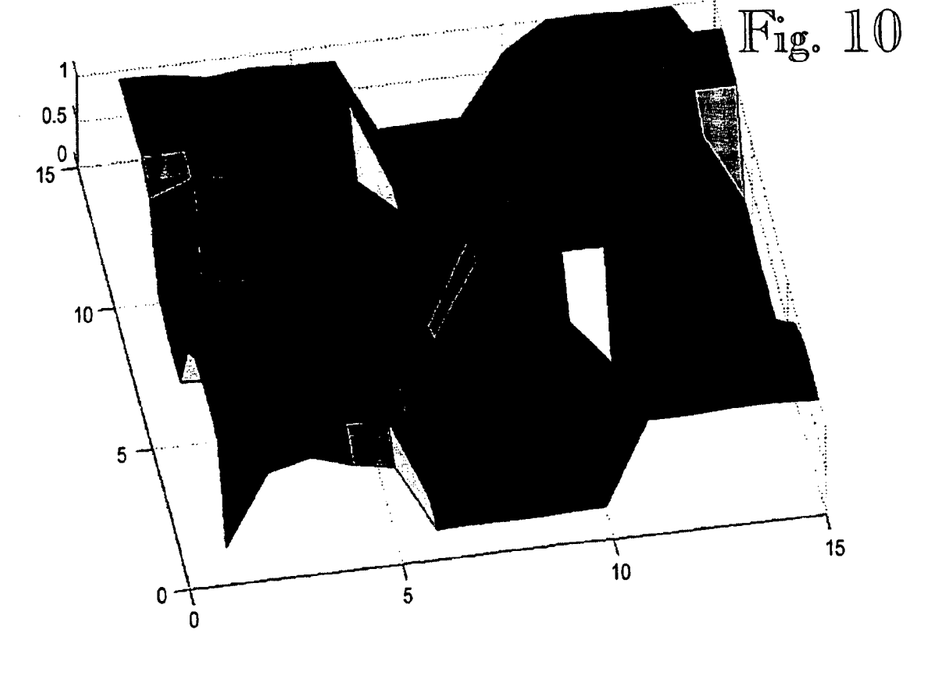

FIGS. 9 and 10 show an SOM map and a coefficient map, respectively. In this example the number of clusters in the input data distribution was reduced by one and the same SOM algorithm was used. FIG. 9 shows the result of both the input and the final configuration of the weight vectors. FIG. 10 shows the resulting $C_i$ values. The five cluster centres are once again quite clear. It is remarkable that the same algorithm, without any adjustments, was capable of finding the new number of clusters and the locations of those clusters.

The way the invention works is as follows. In the beginning there is a predefined lattice, which in this case is two-dimensional. Each point of the lattice is given a label, e.g. (2,3), (0,15). This lattice remains fixed and the labelling of the lattice points does not change. In the above examples, the lattice structure is a 15×15 lattice. It is from the lattice that the distances $d_L$ used in all neighbourhood functions are determined. For instance, the distance between lattice points (1,3) and (7,8) could be 6, depending on the distance measure we use.

Each lattice point is associated with a weight vector. The dimension of the weight vector is always the same as the dimension of the input data vector. In the examples here the input data has two dimensions. It is the weight vectors that change depending on the input data point and the distance between two points on the lattice, the first point being the lattice point associated with the winner and the second point the lattice point associated with the weight vector to be updated. This distance is not used to update the weight vector directly, but to determine the value of the first neighbourhood function in the update of the weight vector.

FIGS. 1 and 7 show a two-dimensional plot of the input data points and the weight vectors from the SOM. The plot is in the input space and by chance all the input points were bounded by [−8, 8]. The data points are just the points shown. The weight vectors are plotted at the crossing point of the lines. Another way of looking at this is to draw a line between weight vectors whose associated lattice nodes are the closest nodes on the lattice. The fact that the plot appears as a lattice means that the weights are organized, that is, the weight vectors associated with adjacent lattice nodes appear in the input data space as adjacent to each other.

The relationship between the coefficients and the SOM lattice is the same as the relationship between the weight vectors and the SOM lattice, except that the dimension of the coefficients is always 1. The relationship is somewhat similar, though not the same as a probability measure, where the probability would be that the weight vector associated with the lattice node with which the coefficient is associated will be chosen as the winner for any given data input. Another interpretation is that the coefficients somehow represent an exaggerated version of the probability distribution of the input data.

In conclusion, we might say that the lattice is a fixed structure. There is one weight vector associated with each lattice node. The weight vector is in the input data space. Similarly, there is one coefficient associated with each lattice node. It is a scalar value and represents an indication of probability, though not the real probability that the weight vector associated with the same lattice node will be chosen as winner for a given input data point.

The dimensionality of the input data and the lattice are not necessarily the same. The input data may have any number of dimensions, such as 5, 10 or 15. In that case the dimensions of the weight vectors would also be 5, 10, or 15. But the lattice could still be two-dimensional. We could also choose a different lattice to begin with (i.e. change the SOM structure) and make it four-dimensional, for example. In this case, if we still choose to have 15 lattice nodes along each axis of the lattice then we would have 15×15×15×15 lattice nodes and associated with each lattice node, a 5, 10 or 15-dimensional weight vector. The examples above use a two-dimensional lattice and a two-dimensional input space merely because it is easier to draw and visualize. In practical implementations one could expect that the input data has more dimensions but the lattice structure could be two-dimensional. The number of lattice nodes along each dimension of the lattice is variable depending on the amount of computational resources available.

Figure 11:
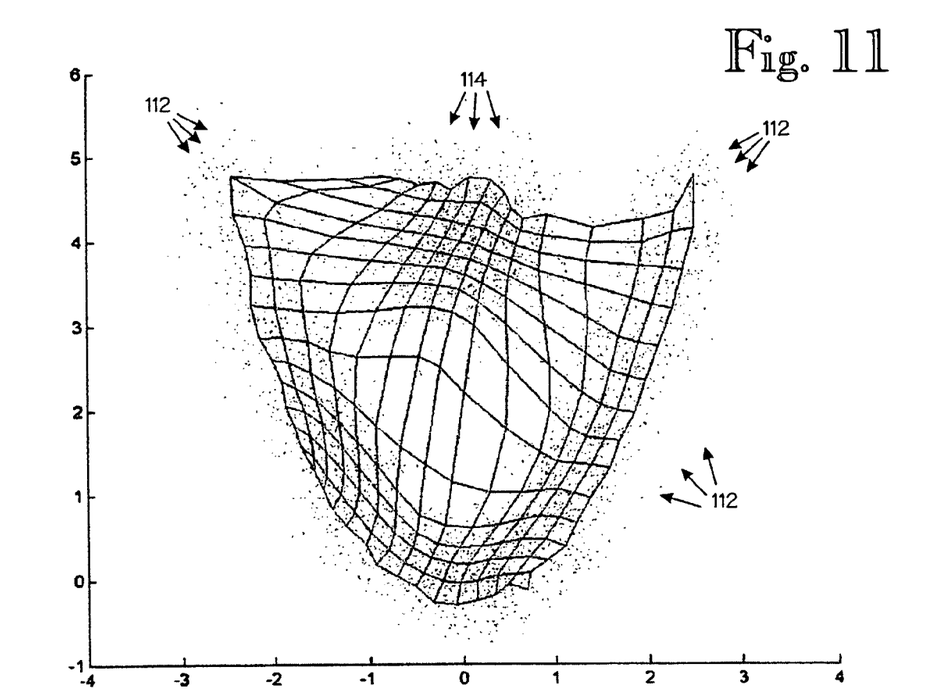
FIGS. 11 and 12 show an SOM and a coefficient map, respectively, for an exceptional distribution of input data.
Figure 12:
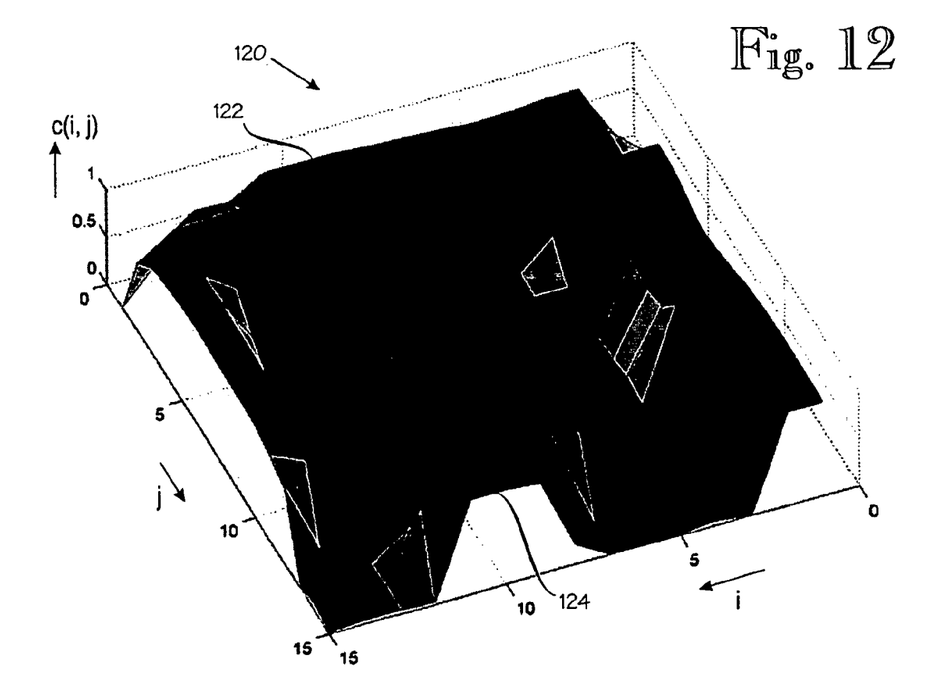

FIG. 11 shows a mixed clustering example consisting of two very different clusters, namely a first cluster 112 described by a normal distribution and a second cluster 114 described by a uniform distribution along a parabola. The same SOM was used as in the previous two examples. FIG. 12 shows a map 120 of coefficients $C_{i,j}$ for this example. There are two distinct areas. There is a connected region 122 of high values around three edges of the lattice which correspond to the parabolic distribution cluster 112 in FIG. 11, and the disc shape 124 of connected values which corresponds to the normal distribution 114. This example is quite interesting because of the complexity of the parabolic distribution. In the mixture model clustering algorithm, without any prior information it would be difficult to generalize this distribution to a normal distribution. Similarly, a K-means approximation would have difficulty in resolving these two clusters as at some points the distance between two points in different clusters is smaller than the distance between two points in the same cluster. In experiments on this example the best K-means came up with four clusters. This example indicates that the clustering algorithm according to the invention may be very general.

Automatic Labelling of Cluster Centres

A further preferred embodiment of the invention relates to automatic and unsupervised labelling of the clusters. The same notation is used here as above and only notation pertinent to this embodiment will be explained. Consider a set of labels B={1, 2, . . . , K}, which will be used to label the clusters.

In practice K should be at least greater than or equal to the expected number of clusters. In the case of no prior knowledge, it may be suitable to let K=N, the total number of weights in the SOM, as this imposes a limit on the maximum number of clusters which can be identified.

For each weight i in the SOM, define a vector of coefficients $\Theta_i$ as:

$$\Theta_i = (\theta_{i,1}, \theta_{i,2}, \ldots \theta_{i,K}) \quad [5]$$

Each coefficient $\theta_{i,1} \in [0, 1]$ represents a weighting between the SOM node i and the label l. The weight i belongs to cluster l if:

$$l = \arg\max \theta_{i,k} \quad [6]$$

$$1 \leq k \leq K$$

The updating algorithm used on these coefficients to achieve automatic labelling proceeds as follows. At time t SOM weight v(t) is chosen as the winner. The weight and its neighbours are updated as in the normal SOM algorithm. Also the coefficient $C_i$ is updated as well as the coefficients $C_j$ of the neighbours of $C_i$. The updating of the coefficients $C_i$ and the interpretation of the results form the basis of the main invention, namely the automatic and unsupervised clustering.

In the automatic and unsupervised labelling of the clusters, at the same time t the $\Theta_i$ are updated as follows. Define lv(t) as the label of the cluster to which the winner weight v(t) is assigned, thus from equation (6), $$lv(t) = \arg\max \theta_{v(t),k}(t) \quad [7]$$

$$1 \leq k \leq K$$

Figure 13:
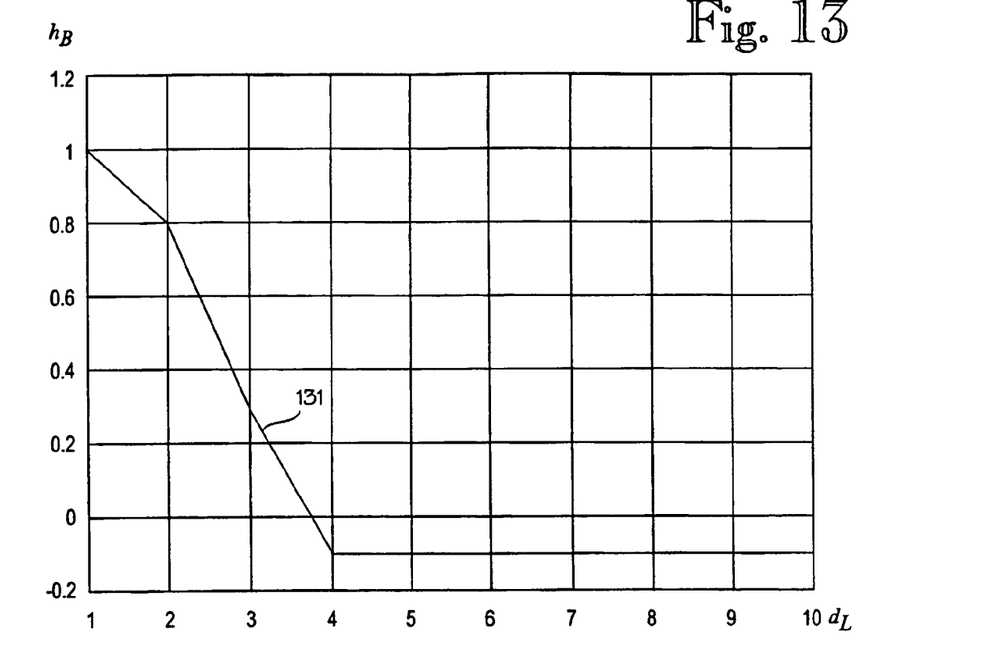
FIG. 13 shows an example of a neighbourhood function used in an automatic cluster-labelling algorithm.

For all the weights j, j=1, . . . N the components $\theta_{j,lv(t)}$ are then updated as follows:

$$\theta_{j,lv(t)}(t+1) = \theta_{j,lv(t)}(t) + C_{v(t)}(t+1)h_B(d_L)\delta \quad [8]$$

where once again $h_B$ is a neighbourhood function and preferably has the form shown in FIG. 13. The idea is that the neighbours of the winning weight will have their $\theta_{j,lv(t)}$ increased to ensure that they will be classified to the same cluster as the winner v(t), whereas weights further away from the winner weight will have their $\theta_{j,lv(t)}$ decreased to ensure that they will be classified to a different cluster than the winner.

For the weights j where the neighbourhood function $h_B(d_L) > 0$ it is also advantageous to decrease the other coefficients $\theta_{j,lv(t)}$, k=1, . . . K, k≠lv(t) in $\Theta_j$ as follows:

$$\theta_{j,k}(t+1) = \theta_{j,k}(t) - C_{v(t)}(t+1)h_B(d_L)\delta \quad [9]$$

This reinforces the labelling of the winner and its neighbours to the cluster label lv(t).

Note that equation [4] uses $C_v$ at iteration t whereas equations [8] and [9] use $C_v$ at iteration t+1. Actually, the $C_v$ coefficient changes so little between iterations that either value can be used, depending on which value is more conveniently available.

Figure 14:
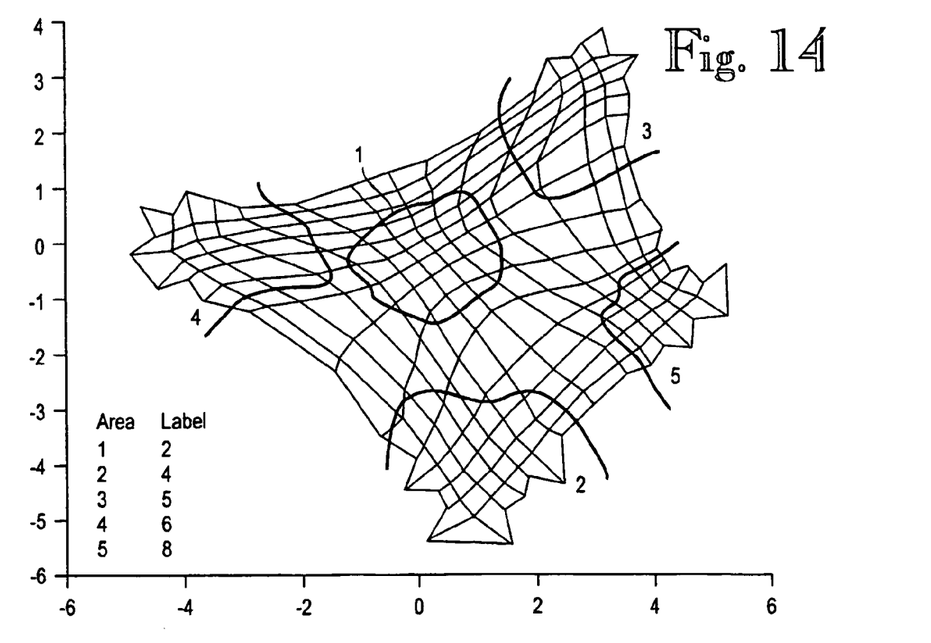
FIG. 14 shows the result of the automatic cluster-labelling algorithm.

FIG. 14 shows an example of the result of the combination of the SOM, automatic clustering and automatic labelling of the clusters in the case of an input distribution consisting of five normal distributions. In this case the set of labels was given by L={1, 2, 3, 4, 5, 6, 7, 8}. The values of the $\theta_{i,j}$ were randomly initialized. FIG. 14 shows an SOM with five distinct regions, one region around each cluster. Each node in the five areas 1 to 5 is assigned a label such that nodes in area 1 have a label of 2, nodes in area 2 have a label of 4, etc. The inter-region areas have a label of 0. These weights had a maximum of $\Theta_i$ lower than a threshold value of 0.2 and therefore they are not assigned as centres to any cluster. It is clear that the cluster centres have been properly labelled with the labels {2, 4, 5, 6, 8}.

Figure 15:
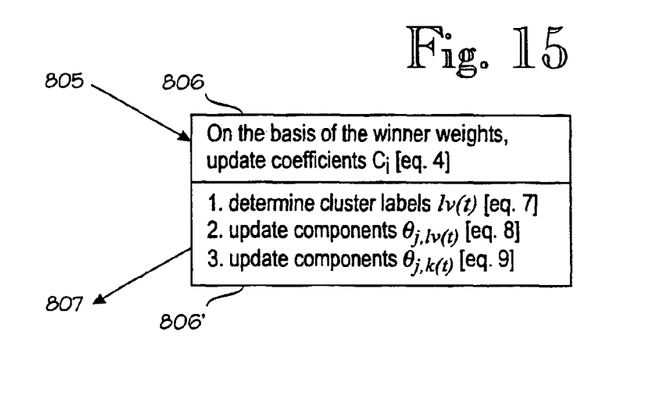
FIG. 15 shows how the automatic cluster-labelling algorithm can be integrated with a cluster-determination algorithm according to the invention.

FIG. 15 shows how the automatic cluster-labelling algorithm can be integrated with the cluster-determination algorithm according to the invention. FIG. 15 is a modification of FIG. 8, with step 806 followed by step 806' that relates to the automatic cluster-labelling algorithm. In step 806, the cluster labels lv(t) are determined according to equation [7]. Then the $\theta_{j,lv(t)}$ components are updated according to equation [8] and the $\theta_{j,k}$ components are updated according to equation [9]. By placing step 806' inside the second iterative process 82, maximal synergy benefits are obtained, or in other words, the computational overhead is kept to a minimum because step 806' makes used of the winner selection and coefficient determination already performed for the SOM construction and the automatic cluster determination.

SUMMARY

The technique according to the invention allows automatic determination of cluster centres with a minimal amount of information on the data. No explicit, initial estimate of the number of clusters is required. Given the nature of convergence of the SOM, there is no need to know the type of distribution of the clusters either. In this respect the algorithm is very general. However, although explicit initial estimates of the number of clusters are not required, care should be taken to ensure that the SOM lattice contains a number of nodes larger than the expected number of clusters, as well as choosing a non-monotonous neighbourhood function that is negative for large distances and provides a level of lateral inhibition to ensure that the coefficients for the cluster regions stand out more clearly.

The preferred embodiment of the invention, in which the second iterative process is interleaved with the conventional iterative process, requires little computational overhead. Thus this embodiment of the invention is especially suitable for on-line application where human supervision is not available. Initial simulations on artificial data show that the inventive technique is simple and apparently robust and is more easily generalized than most current clustering algorithms. The technique according to the invention can be considered somewhat as a hybrid of the K-means and probabilistic-model-based clustering.

It is readily apparent to a person skilled in the art that, as the technology advances, the inventive concept can be implemented in various ways. The invention and its embodiments are not limited to the examples described above but may vary within the scope of the claims.

The invention claimed is:

1. A method, comprising:
   determining, by an apparatus, cluster centers in a first data structure, wherein the first data structure comprises a lattice structure of weight vectors that create an approximate representation of a plurality of input data points, and wherein a plurality of the weight vectors represents a single non-linear cluster;
   performing, by the apparatus, a first iterative process with iterations each including determining a winner weight for each data point and then updating each weight vector corresponding to the winner weight with a first neighborhood function and a corresponding first coefficient updated in a second iterative process such that the weight vectors move toward the cluster centers;
   performing, by the apparatus, the second iterative process with iterations each including updating said corresponding first coefficient in a second data structure by utilizing a second neighborhood function and the winner weight determined in the first iterative process; and
   determining by the apparatus, based on the second data structure, several sets of weight vectors in said lattice structure such that in each set, the weight vectors correspond to the same cluster centers of the input data points,
   wherein the first coefficient is limited to a range, the first neighborhood function gives only positive values, and the second neighborhood function gives negative values in a distance range between 0 and 1.

2. The method according to claim 1,
   wherein the winner weight vector for each data point is determined on the basis of the distance between the data point and the weight vectors, and
   each iteration in the first iterative process further includes calculating a next value for each weight vector on the basis of the current value of the weight vector and the first neighborhood function of the distance on the lattice structure between the weight vector and the winner weight vector, and
   wherein each iteration in the second iterative process further includes calculating a next value of each of the first coefficients based on:
   the current value of the each first coefficient, and a combination of
   a first coefficient of the winner weight vector,
   the second neighborhood function of the distance on the lattice structure between the weight vector and the winner weight vector, and
   an adjustment factor for adjusting convergence speed between iterations.

3. The method according to claim 2, wherein the combination is or comprises multiplication.

4. The method according claim 2, wherein the second neighborhood function is not monotonous.

5. The method according to claim 2, wherein the second neighborhood function gives negative values within 0 and −0.4 in a distance range between 0.1 and 1.

6. The method according to claim 2, wherein the second neighborhood function depends on a number of prior iterations.

7. The method according to claim 2, wherein the first data structure is or comprises a self-organizing map.

8. The method according to claim 7, further comprising:
   estimating an upper limit K for a number of clusters in the self-organizing map;
   defining a coefficient vector $\Theta i=(\theta_{i,1}, \theta_{i,2}, \ldots \theta_{i,K})$ for each weight vector i in the self-organizing map, the coefficient vector comprising K second coefficients $\theta_{i,1}$, each of which represents a weighting between the weight vector i and a label l; and
   assigning cluster label l to weight vector i if:
   l =arg max $\theta_{i,k}$, $1 \leq k \leq K$.

9. The method according to claim 8, wherein each iteration in the second iterative process comprises calculating a next value of each second coefficient based on the current value of the second coefficient and a combination of
   a coefficient of the winner weight vector,
   a third neighborhood function of distance, and
   an adjustment factor for adjusting convergence speed between iterations.

10. The method according to claim 1, wherein the determining the weight vectors that correspond to cluster centers comprises selecting local maxima in the second data structure.

11. The method according to claim 1, wherein the input data points represent real-world quantities.

12. A computer-readable storage medium carrying one or more sequences of one or more instructions which, when executed by one or more processors causes an apparatus to perform at least the following:

determining cluster centers in a first data structure, wherein the first data structure comprises a lattice structure of weight vectors that create an approximate representation of a plurality of input data points; and wherein a plurality of the weight vectors represents a single non-linear cluster;

performing a first iterative process with iterations each including determining a winner weight for each data point and then updating each weight vector corresponding to the winner weight with a first neighborhood function and a corresponding first coefficient updated in a second iterative process such that the weight vectors move toward the cluster centers;

performing the second iterative process with iterations each including updating said corresponding first coefficient in a second data structure by utilizing a second neighborhood function and the winner weight determined in the first iterative process; and determining, based on the second data structure, several sets of weight vectors in said lattice structure such that in each set, the weight vectors correspond to the same cluster centers of the input data points, wherein the first coefficient is limited to a range, the first neighborhood function gives only positive values, and the second neighborhood function gives negative values in a distance range between 0 and 1.

13. A computer-readable storage medium according to claim 12, wherein the winner weight vector for each data point is determined on the basis of the distance between the data point and the weight vectors, and each iteration in the first iterative process further includes calculating a next value for each weight vector on the basis of the current value of the weight vector and the first neighborhood function of the distance on the lattice structure between the weight vector and the winner weight vector, and wherein each iteration in the second iterative process further includes calculating a next value of each of the first coefficients based on:

the current value of the each first coefficient, and a combination of a first coefficient of the winner weight vector, the second neighborhood function of the distance on the lattice structure between the weight vector and the winner weight vector, and an adjustment factor for adjusting convergence speed between iterations.

14. An apparatus, comprising:

at least one processor; and at least one memory including computer program code, wherein the at least one memory and the computer program code configured to, with the at least one processor, cause the apparatus to perform at least the following:

determine cluster centers in a first data structure, wherein the first data structure comprises a lattice structure of weight vectors that create an approximate representation of a plurality of input data points; and wherein a plurality of the weight vectors represents a single non-linear cluster;

perform a first iterative process with iterations each including determining a winner weight for each data point and then updating each weight vector corresponding to the winner weight with a first neighborhood function and a corresponding first coefficient updated in a second iterative process such that the weight vectors move toward the cluster centers;

perform the second iterative process with iterations each including updating said corresponding first coefficient in a second data structure by utilizing a second neighborhood function and the winner weight determined in the first iterative process; and determine, based on the second data structure, several sets of weight vectors in said lattice structure such that in each set, the weight vectors correspond to the same cluster centers of the input data points, wherein the first coefficient is limited to a range, the first neighborhood function gives only positive values, and the second neighborhood function gives negative values in a distance range between 0 and 1.

15. The apparatus of claim 14, wherein the apparatus is further caused to:

determine the winner weight vector for each data point on the basis of the distance between the data point and the weight vectors;

calculate a next value for each weight vector on the basis of the current value of the weight vector and the first neighborhood function of the distance on the lattice structure between the weight vector and the winner weight vector; and calculate a next value of each of the first coefficients based on:

the current value of the each first coefficient, and a combination of a first coefficient of the winner weight vector, the second neighborhood function of the distance on the lattice structure between the weight vector and the winner weight vector, and an adjustment factor for adjusting convergence speed between iterations.

16. The apparatus of claim 15, wherein the apparatus is further caused to determine the weight vectors that correspond to cluster centers by selecting local maxima in the second data structure.

17. The apparatus of claim 15, wherein the combination is or comprises multiplication.

18. The apparatus of claim 15, wherein the second neighborhood function is not monotonous.

19. The apparatus of claim 15, wherein the second neighborhood function gives negative values within 0 and −0.4 in a distance range between 0.1 and 1.

20. The apparatus of claim 15, wherein the second neighborhood function depends on a number of prior iterations.

21. The apparatus of claim 15, wherein the input data points represent real-world quantities.

22. The apparatus of claim 15, wherein the first data structure is or comprises a self-organizing map.

23. The apparatus of claim 15, wherein the apparatus is further caused to:

estimate an upper limit K for a number of clusters in the self-organizing map;

define a coefficient vector $\Theta i=(\theta_{i,1}, \theta_{i,2}, \ldots \theta_{i,K})$ for each weight vector i in the self-organizing map, the coefficient vector comprising K second coefficients $\theta_{i,1}$, each of which represents a weighting between the weight vector i and a label l; and assign cluster label l to weight vector i if:

l = arg max $\theta_{i,k}$, $1 \leq k \leq K$.

24. The apparatus of claim 15, wherein the wherein the apparatus is further caused in each iteration in the second iterative process to calculate a next value of each second coefficient based on the current value of the second coefficient and a combination of a coefficient of the winner weight vector, a third neighborhood function of distance, and an adjustment factor for adjusting convergence speed between iterations.

* * * * *